US012051849B2

(12) United States Patent
Ogawa et al.

(10) Patent No.: US 12,051,849 B2
(45) Date of Patent: Jul. 30, 2024

(54) SPACER-ATTACHED ANTENNA UNIT AND ANTENNA UNIT-ATTACHED GLASS WINDOW

(71) Applicant: AGC Inc., Tokyo (JP)

(72) Inventors: Mayu Ogawa, Tokyo (JP); Akira Saito, Tokyo (JP)

(73) Assignee: AGC Inc., Tokyo (JP)

( * ) Notice: Subject to any disclaimer, the term of this patent is extended or adjusted under 35 U.S.C. 154(b) by 149 days.

(21) Appl. No.: 17/664,996

(22) Filed: May 25, 2022

(65) Prior Publication Data

US 2022/0285823 A1 Sep. 8, 2022

Related U.S. Application Data

(63) Continuation of application No. PCT/JP2020/043778, filed on Nov. 25, 2020.

(30) Foreign Application Priority Data

Dec. 3, 2019 (JP) ................................. 2019-218864

(51) Int. Cl.

*H01Q 1/32* (2006.01)
*H01Q 1/12* (2006.01)
*H01Q 9/16* (2006.01)

(52) U.S. Cl.

CPC ............. *H01Q 1/1271* (2013.01); *H01Q 9/16* (2013.01)

(58) Field of Classification Search

CPC .......... H01Q 1/12; H01Q 1/1271; H01Q 1/27; H01Q 1/32; H01Q 9/16; E06B 7/28; G06F 3/00; G06F 17/50

See application file for complete search history.

(56) References Cited

U.S. PATENT DOCUMENTS

| | | | | |
|---|---|---|---|---|
| 3,818,489 A * | 6/1974 | Bobel, II | B60J 1/02 | 343/906 |
| 4,658,259 A * | 4/1987 | Blaese | H01Q 1/1285 | 343/826 |
| 5,168,280 A * | 12/1992 | Blaese | H01Q 1/1285 | 343/715 |
| 6,825,812 B2 * | 11/2004 | Yokota | H01Q 1/32 | 343/711 |
| 7,365,685 B2 | 4/2008 | Takeuchi et al. | | |
| 7,592,960 B2 * | 9/2009 | Byrne | H01Q 1/3275 | 343/872 |
| 11,165,135 B2 * | 11/2021 | Hiramatsu | C03C 17/23 | |
| 11,512,526 B2 * | 11/2022 | Ogawa | H01Q 1/002 | |

(Continued)

FOREIGN PATENT DOCUMENTS

| | | |
|---|---|---|
| EP | 3 805 510 A1 | 4/2021 |
| JP | 60-169952 U | 11/1985 |

(Continued)

OTHER PUBLICATIONS

International Search Report issued Feb. 22, 2021 in PCT/JP2020/043778, filed on Nov. 25, 2020, 2 pages.

*Primary Examiner* — Tho G Phan

(74) *Attorney, Agent, or Firm* — Oblon, McClelland, Maier & Neustadt, L.L.P.

(57) ABSTRACT

A spacer-attached antenna unit is to be attached, via the spacer, to a glass plate included in a glass window, wherein the antenna unit is configured to detachably attach to the glass window via a detachable member.

20 Claims, 16 Drawing Sheets

(56) References Cited

U.S. PATENT DOCUMENTS

| | | | |
|---|---|---|---|
| 2008/0272260 | A1 | 11/2008 | Baranski |
| 2017/0207514 | A1 | 7/2017 | Kamo |
| 2019/0288383 | A1 | 9/2019 | Shiozaki et al. |

FOREIGN PATENT DOCUMENTS

| | | | |
|---|---|---|---|
| JP | 2008-529206 | A | 7/2008 |
| JP | 2012-140766 | A | 7/2012 |
| JP | 2012-148966 | A | 8/2012 |
| JP | 2016-42119 | A | 3/2016 |
| WO | WO 2006/077149 | A1 | 7/2006 |
| WO | WO 2019/017628 | A1 | 1/2019 |

* cited by examiner

SPACER-ATTACHED ANTENNA UNIT AND ANTENNA UNIT-ATTACHED GLASS WINDOW

CROSS-REFERENCE TO RELATED APPLICATIONS

This application is a continuation of International Application PCT/JP2020/043778, filed on Nov. 25, 2020 and designated the U.S., which is based on and claims priority to Japanese Patent Application No. 2019-218864 filed on Dec. 3, 2019, with the Japan Patent Office. The entire contents of these applications are incorporated herein by reference.

TECHNICAL FIELD

The present disclosure relates to a spacer-attached antenna unit and an antenna unit-attached glass window.

BACKGROUND ART

PTL 1, PTL 2, and the like disclose proposals for including an existing glass window in an insulated glazing by adhering (affixing), with butyl rubber, a spacer-attached glass plate to a glass plate of an existing glass window.

A bottom portion of such a spacer-attached glass plate is placed on a setting block and then the spacer-attached glass plate is pressed against the glass plate of the glass window, thereby affixing the spacer-attached glass plate to the glass plate with the butyl rubber.

Since the insulated glazing glass window disclosed in PTL 1 and PTL 2 uses a spacer-attached glass plate having an area (i.e., the area of the main surface of the glass plate; the same applies to the case described below) substantially equal to the area of the glass plate of the glass window, when the bottom portion of the spacer-attached glass plate is placed on a setting block, the spacer-attached glass plate can be stably affixed to the glass plate of the glass window.

However, in a case where a compact member having an area smaller than that of the glass plate of the glass window is to be attached to the glass plate, it is difficult to affix the compact member using the aforementioned setting block. In such a case, it is conceivable to fix the compact member to the glass plate using only an adhesive such as butyl rubber.

Nowadays, there is demand to effectively use a glass plate of an existing glass window as a support member for supporting an antenna by affixing, to the glass plate of the glass window, a compact antenna unit having an antenna function (i.e., a function for transmitting and receiving electromagnetic waves).

Such an antenna unit may need to be removed from the glass window to be repaired or when maintenance is to be performed, however this can be problematic in that it is difficult to remove the antenna unit from the glass plate when fixed by an adhesive as described above.

The present disclosure has been made in view of such circumstances, and it is an objective of the present disclosure to provide a spacer-attached antenna unit and an antenna unit-attached glass window that enable easy removal of the antenna unit from the glass window.

CITATION LIST

Patent Literature

[PTL 1] Unexamined Japanese Patent Publication No. 2012-140766

[PTL 2] Unexamined Japanese Patent Publication No. 2012-148966

SUMMARY OF THE INVENTION

According to at least one embodiment of the present disclosure a spacer-attached antenna unit is to be attached, via the spacer, to a glass plate included in a glass window, wherein the antenna unit is configured to detachably attach to the glass window via a detachable member.

MODES FOR CARRYING OUT THE INVENTION

Hereinbelow, preferred embodiments of a spacer-attached antenna unit and an antenna unit-attached glass window according to the present disclosure are described with reference to the appended drawings.

Figure 1:
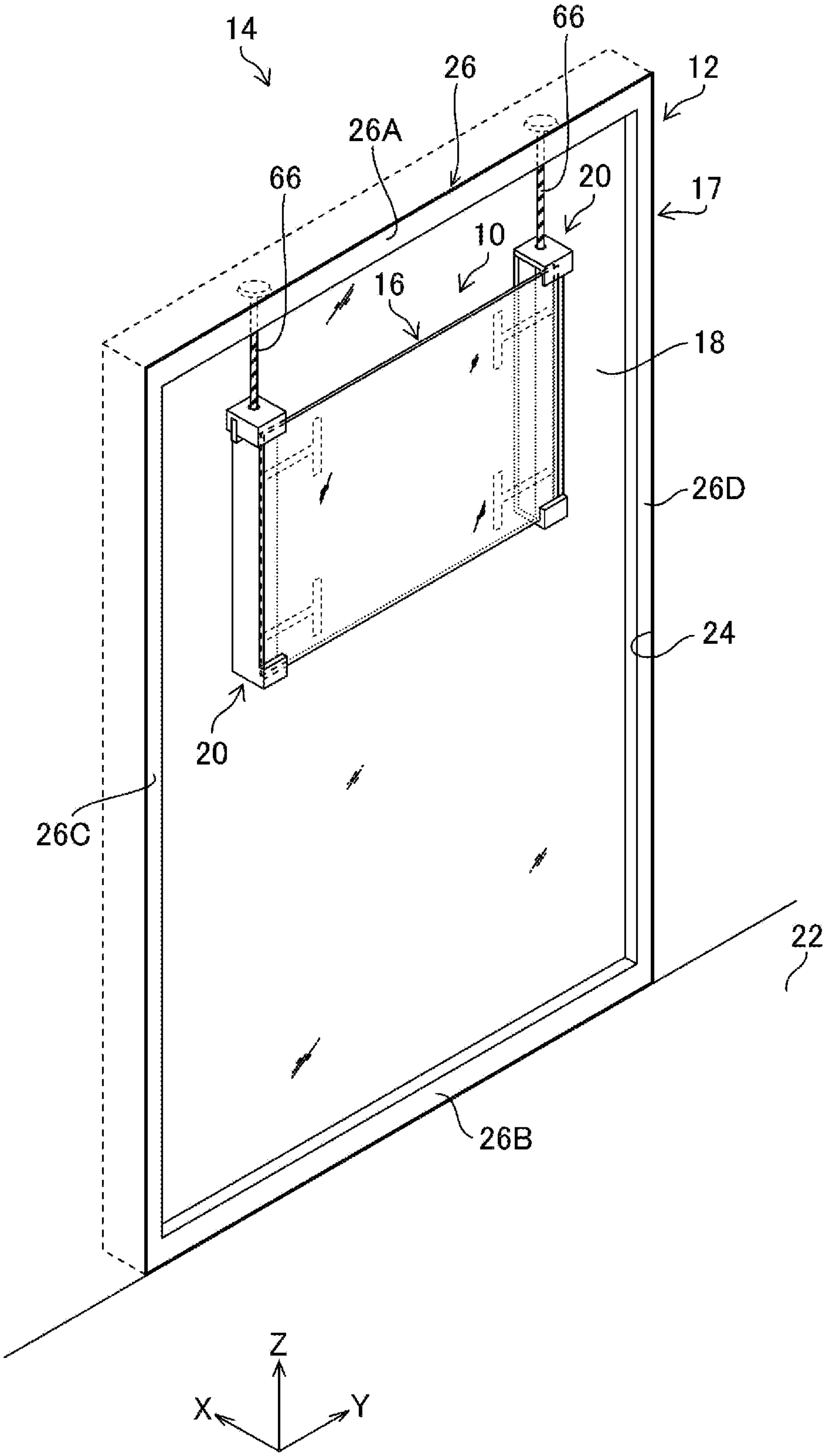
FIG. 1 is a perspective view of an antenna unit-attached glass window according to a first embodiment as viewed from inside a building.
Figure 2:
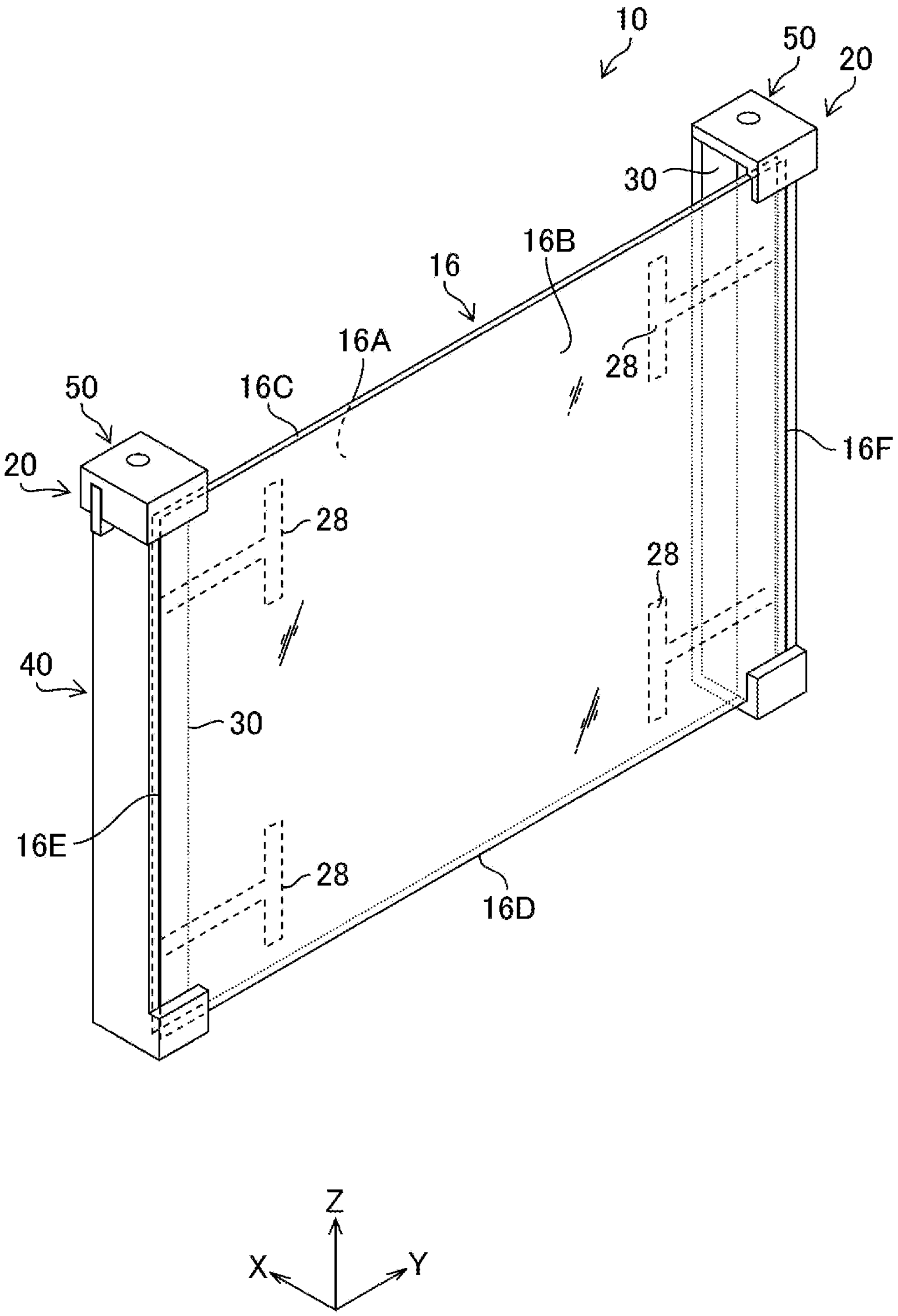
FIG. 2 is an enlarged perspective view of a spacer-attached antenna unit according to the first embodiment.

FIG. 1 is a perspective view of an antenna unit-attached glass window 12, according a first embodiment, in which a spacer-attached antenna unit 10, according to the first embodiment, is attached to a glass window 17. FIG. 2 is an enlarged perspective view of the spacer-attached antenna unit 10 illustrated in FIG. 1. It should be noted that the spacer-attached antenna unit 10 as viewed from inside a building 14 is illustrated in FIG. 1 and FIG. 2.

The spacer-attached antenna unit 10 illustrated in FIG. 1 and FIG. 2 includes an antenna unit 16 and this antenna unit 16 is detachably attached, via a pair of spacers 20 and 20, to a glass plate 18 included in the glass window 17. The spacers 20 and 20 is an example of a detachable member. That is, the first embodiment describes an aspect in which the detachable member is constituted by the spacer 20 and in which the antenna unit 16 is detachably attached to the glass plate 18 by the spacer 20. The X direction described below refers to a thickness direction of the glass plate 18, whereas the Y direction refers to a width direction of the glass plate 18, i.e., a direction that is orthogonal to the X direction. Further, the Z direction refers to a height direction of the glass plate 18, i.e., a direction that is orthogonal to the X direction and the Y direction. In the embodiments, the vertical direction is described as an example of the Z direction, but the Z direction does not indicate only the strictly vertical direction. The Z direction may be a direction slightly inclined with respect to the strictly vertical direction.

The glass window 17 is an existing fixture vertically installed, in the Z direction with respect to a floor surface 22 of the building 14, in an opening portion 24 of the building 14. This glass window 17 includes a rectangular glass plate 18 and a window frame (also referred to as a sash) 26 made of metal attached to vertical edge portions and horizontal edge portions of the glass plate 18. The glass plate 18 may be applied to a single glass plate, insulated glazing glass, or laminated glass. The window frame 26 is a known component configured to be in a frame shape including a top horizontal frame 26A and a bottom horizontal frame 26B in the Y direction, and including a left vertical frame 26C and a right vertical frame 26D in the Z direction.

As illustrated in FIG. 2, the antenna unit 16 is mainly constituted by a plate made of glass in a rectangular shape in a plan view, and includes front and back main surfaces 16A and 16B, a top edge surface 16C, a bottom edge surface 16D, a left edge surface 16E, and a right edge surface 16F. Here, the surface facing the exterior is described as the front surface (main surface 16A) whereas the surface facing the interior is described as the back surface (main surface 16B).

As illustrated in FIG. 1, the antenna unit 16 is configured to have an area smaller than that of the glass plate 18, and an arranged position of the antenna unit 16 is set to a high position on the glass plate 18 due to the sensitivity for transmission and reception of electromagnetic waves. The expression "high position" is not particularly meant to strictly designate the position where the antenna unit 16 is arranged. For example, with the middle position in the Z direction of the glass plate 18 being adopted as the boundary, an upper side with respect to the middle position may be defined as the high position. In the embodiments, the antenna unit 16 is illustrated in a rectangular shape, but the antenna unit 16 may be, for example, in a shape of a circle such as an ellipse or a perfect circle, or may be in a shape of a polygon other than a square.

The antenna unit 16 includes an antenna 28 on the main surface 16A. The antenna 28 is provided by printing a metal material on the main surface 16A. Examples of metal materials constituting the antenna 28 include conductive materials such as gold, silver, and copper. In addition, the antenna 28 preferably has a light-transmitting property. The antenna 28 having the light-transmitting property is preferable because the light-transmitting property improves the aesthetic and can reduce the average solar absorption rate. Conductive traces (not illustrated) are connected to the antenna 28. In the antenna 16 configured as described above, the vertical edge portions on both of the left and right sides of the main surface 16A are attached to the glass plate 18 via the pair of spacers 20 and 20 described above.

Figure 3:
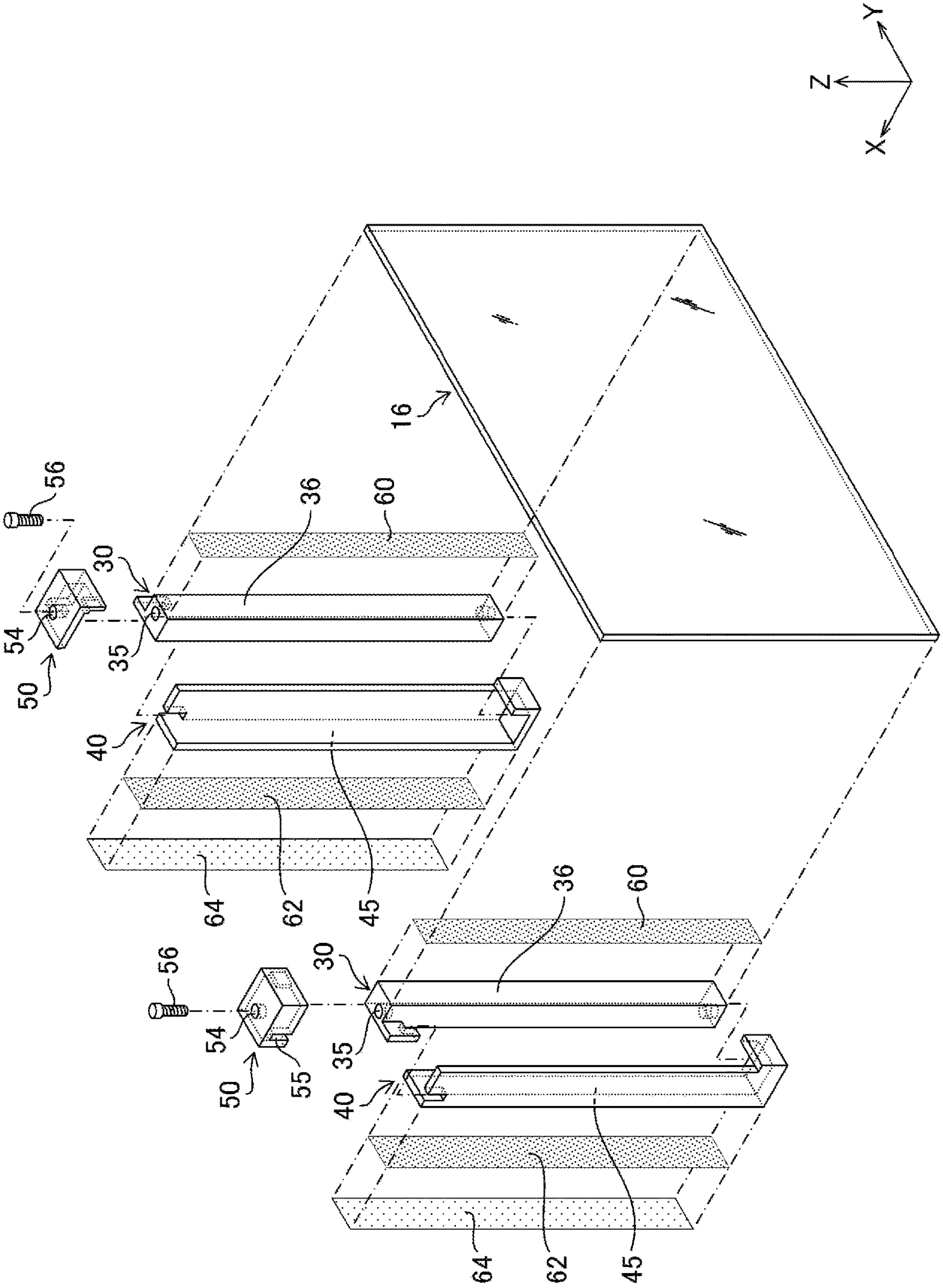
FIG. 3 is an assembly perspective view of the spacer-attached antenna unit illustrated in FIG. 2.
Figure 4:
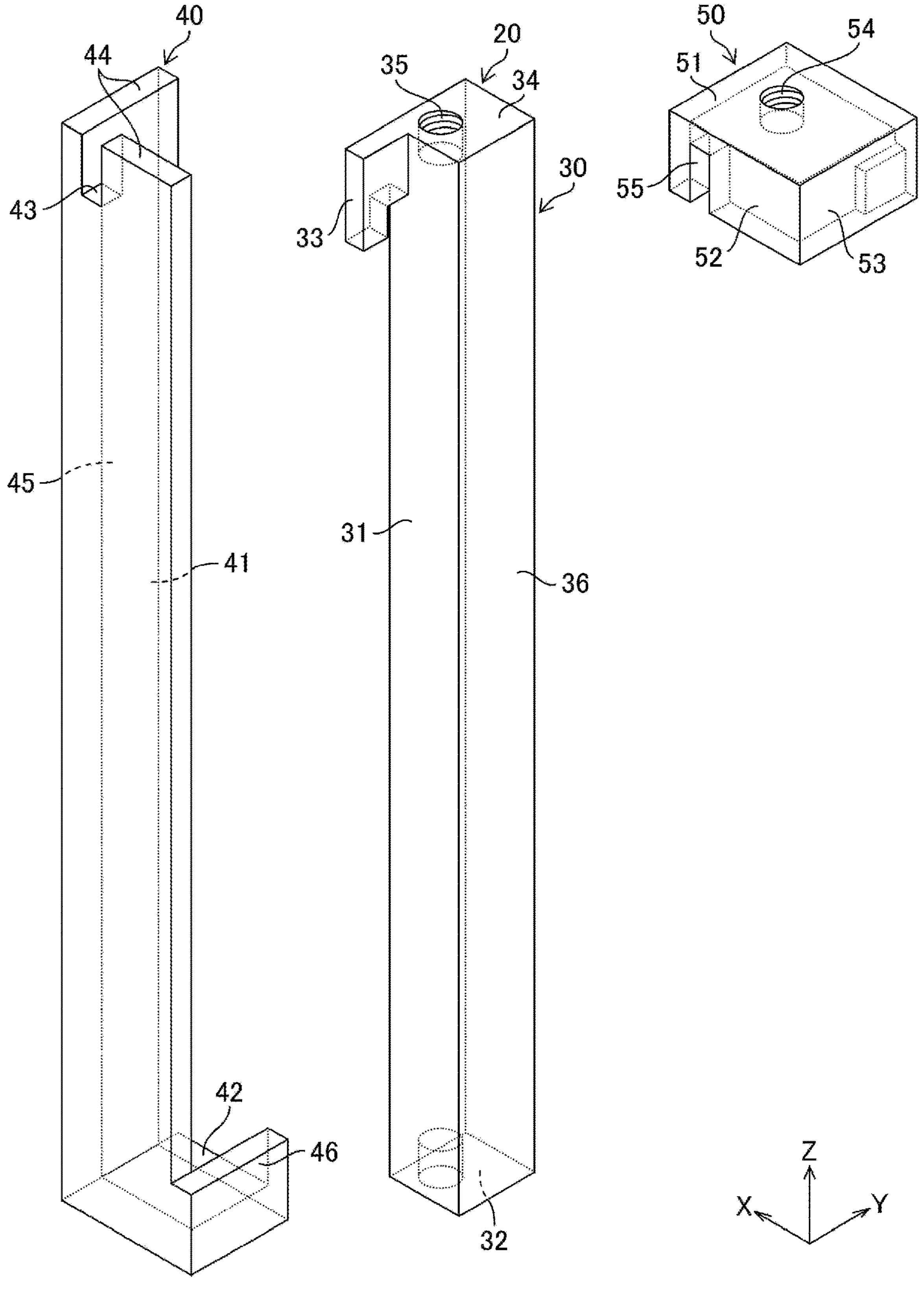
FIG. 4 is an assembly perspective view of a spacer disposed on the left side in FIG. 2.
Figure 5:
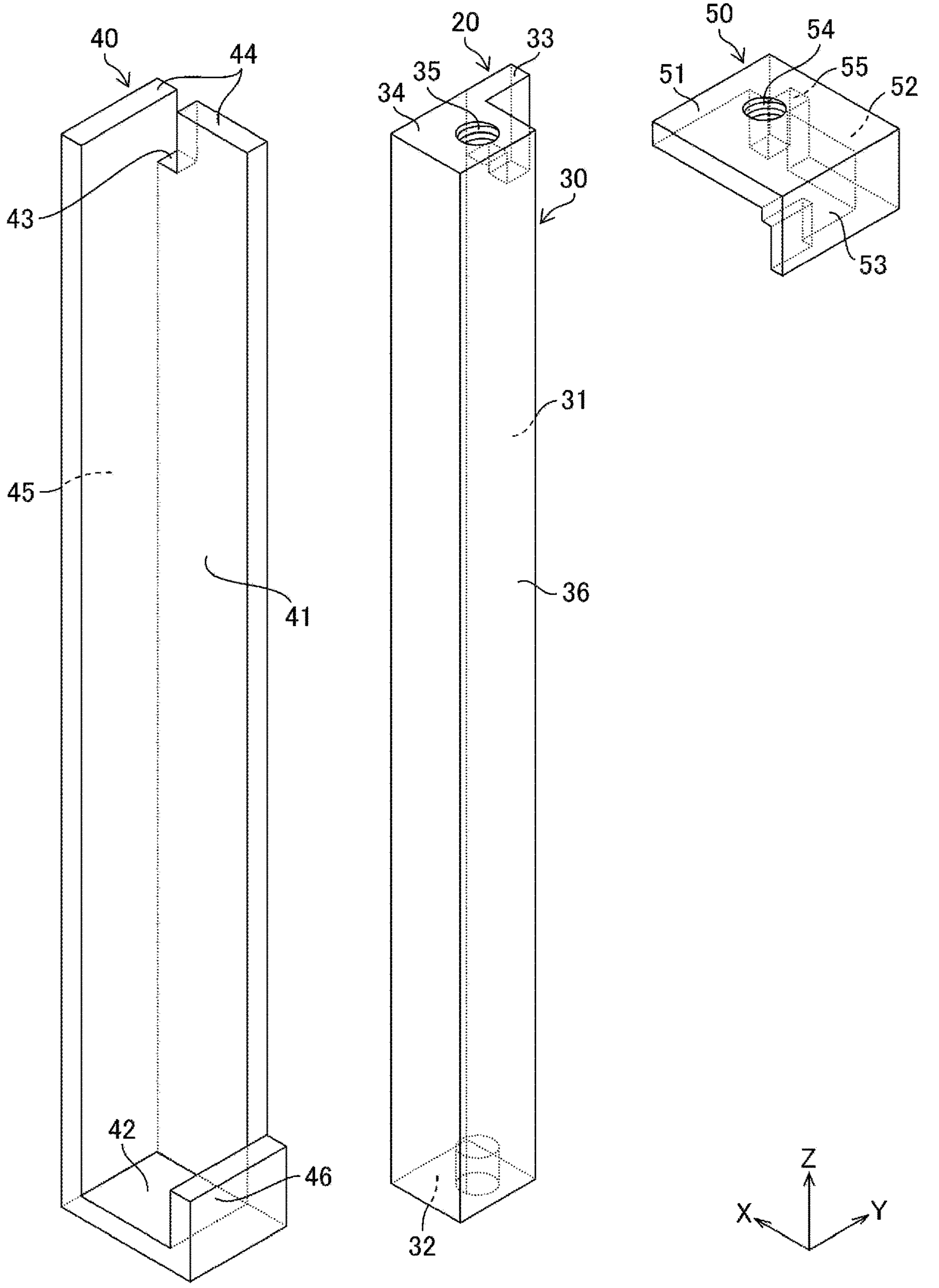
FIG. 5 is an assembly perspective view of a spacer disposed on the right side in FIG. 2.

FIG. 3 is an assembly perspective view of the spacer-attached antenna unit 10. Also, FIG. 4 is an assembly perspective view of the spacer 20 on the left side illustrated in FIG. 2, whereas FIG. 5 is an assembly perspective view of the spacer 20 on the right side illustrated in FIG. 2. In the description below for the configuration of the spacer 20, since the spacers 20 and 20 on the left and right illustrated in FIG. 3 to FIG. 5 have the same configuration, the spacer 20 illustrated in FIG. 4 is described and the spacer 20 illustrated in FIG. 5 is denoted with the same reference numerals as the spacer 20 in FIG. 4 in lieu of providing a description.

As illustrated in FIG. 4, the spacer 20 includes a first spacer 30 to be attached to the antenna unit 16 (see FIG. 3) side, a second spacer 40 to be attached to the glass plate 18 (see FIG. 1) side, and a fastening part 50 that detachably fixes the first spacer 30 and the second spacer 40.

The first spacer 30 and the second spacer 40 are rectangular columnar members each having a longitudinal axis (Z axis). Specifically, the first spacer 30 is a columnar member in which the cross-sectional shape in the X-Y plane is substantially rectangular whereas the second spacer 40 is a columnar member in which a cross-sectional shape in the X-Y plane is L-shaped.

The first spacer 30 and the second spacer 40 respectively have a guide surface 31 and a guide surface 41 for slidably guiding the first spacer 30 and the second spacer 40 in the direction of the respective longitudinal axes and respectively have a designating portion 32 and a designating portion 42 that designate a mutual linking position within a sliding range in which the first spacer 30 and the second spacer 40 are slidable. As one example, the guide surfaces 31 and 41 are configured as flat side surfaces facing each other in the Y direction. Also, as one example, the designating portion 32 is configured as a flat bottom surface formed on the bottom portion of the first spacer 30. As one example, the designating portion 42 is configured as a flat bottom surface formed on the bottom portion of the second spacer 40. The first spacer 30 and the second spacer 40 are detachably attachable by bringing the designating portion 32 into contact with the designating portion 42 or by placing the designating portion 32 on the designating portion 42. The designating portion 32 and the designating portion 42 may be detachably fixed by a set screw (not illustrated).

Also, an engaging portion is provided on a top surface 34 of the first spacer 30 and an engaging portion is provided on a top surface 44 of the second spacer 40. These engaging portions are a groove 43 formed on the top surface 44 of the second spacer 40 in the Z-axis direction and a hook part 33 formed on the top surface 34 of the first spacer 30 in the Z-axis direction. The groove 43 and the hook part 33 become engaged by sliding the first spacer 30 and the second spacer 40 with respect to each other in a state where the guide surfaces 31 and 41 are in contact with each other in the Z-axis direction. By doing so, the first spacer 30 is restricted from tilting with respect to the second spacer 40.

In the spacer 20 of the embodiment, the top portion of the second spacer 40 is open so that the top portion of the first spacer 30 can protrude from the top portion of the second spacer in order to enable the aforementioned sliding and engaging actions to be performed. Also, a wall portion 46 on the bottom portion of the second spacer 40 protrudes in the Z direction and comes in contact with the bottom portion of the first spacer 30. The bottom portion of the first spacer 30 is brought into contact with this wall portion 46, thereby restricting the first spacer 30 from tilting. The groove 43 may be formed on the first spacer 30 side and the hook part 33 may be formed on the second spacer 40 side.

The fastening part 50 is substantially lid shaped and includes a top plate 51; and two wall portions 52 and 53 that are orthogonal to each other. The top plate 51 covers the top surface 34 of the first spacer 30 and the top surface 44 of the second spacer 40. Further, a screw hole 54 (or alternatively a through hole) may be provided in the top plate 51 extending therethrough in the Z-axis direction. A screw hole 35 may be provided, in the Z-axis direction, in the top surface 34 of the first spacer 30 facing this screw hole 54. Also, in the case where the top surfaces 34 and 44 are covered by the top plate 51, a clearance groove 55 may be formed, in the Z-axis direction, in the wall portion 52 for avoiding interference with the hook part 33.

The fastening part 50 configured as described above is linked to the first spacer 30 by covering the top surfaces 34 and 44 with the top plate 51 and screwing the set screw 56 (see FIG. 3) into the screw hole 35 from the screw hole 54. In this case, since the first spacer 30 and the second spacer 40 are engaged by the engaging portions, the first spacer 30 and the second spacer 40 are detachably linked by the fastening portion 50 by linking the fastening part 50 to the first spacer 30 with the set screw 56 as described above. In the spacer-attached antenna unit 10 of the embodiments, although the fastening part 50 is not an essential member, the inclusion of the fastening part 50 is preferable because the fastening part 50 can fix the first spacer 30 and the second spacer 40. Also, by fixing the first spacer 30 and the second spacer 40 by the fastening part 50, the distance between the glass window 17 and the antenna unit 16 can be maintained, thereby ensuring stable antenna performance of the antenna unit 16.

The spacer-attached antenna unit 10 having the spacers 20 of the aforementioned configuration is configured by affixing the antenna unit 16 to the first spacer 30 by adhesive tape 60 as illustrated in FIG. 3. Also, the spacer-attached antenna unit 10 is affixed to the glass plate 18 (see FIG. 1) by adhesive tape 62 that is affixed to the second spacer 40.

The adhesive tape 60 is an example of a first adhesive tape and is affixed along the side surface 36 of the first spacer 30 facing the interior side (i.e., an interior side facing side surface 36 of the first spacer 30). Also, the adhesive tape 62 is an example of a second adhesive tape that is affixed along a side surface 45 of the second spacer 40 facing the glass plate 18 (i.e., a glass plate 18 facing side surface 45). A release liner 64 is pre-affixed to the adhesive tape 62 until the spacer-attached antenna unit 10 is affixed to the glass plate 18.

The first spacer 30, the second spacer 40, and the fastening part 50 that constitute the spacer 20 are preferably transparent members. Also, the adhesive tape 60 and 62 are preferably transparent members. The spacer 20, the adhesive tap 60, and the adhesive tape 62, as transparent members, enable the transparency of the glass plate 18 to be maintained and enhance the aesthetic of the antenna unit-attached glass window 12. The spacer 20 which is a transparent member may be acrylic. Also, examples of the adhesive tape 60 and 62 which are transparent members include strong double-sided adhesive tape having an acrylic foam base (e.g., 3M VHB Tape (registered trademark) produced by Sumitomo 3M Limited).

The spacer 20 and the adhesive tape 60 and 62 are not limited to a transparent member. Examples of the spacer 20 include spacers made of made of AES (acrylonitrile ethylene-propylene-diene styrene) and spacers made of polycarbonate. Also, examples of the adhesive tape 60 and 62 include butyl tape and HYPERJOINT (registered trademark) produced by Nitto Denko Corporation.

Next, an example of an assembly method of the antenna unit-attached glass window 12 according to the first embodiment is described.

First, in order to assemble the spacer-attached antenna unit 10, the first spacers 30 and 30 are affixed to the vertical edge portions on both of the left and right sides of the main surface 16A of the antenna unit 16 by the adhesive tape 60 and 60. Next, the first spacers 30 and 30 that are affixed to the antenna unit 16 and the second spacers 40 and 40 are linked. That is, the first spacer 30 is slid downward with respect to the second spacer 40 in a state where the top portion of the first spacer 30 is protruding from the top portion of the second spacer 40 and where the guide surface 31 of the first spacer 30 and the guide surface 41 of the second spacer 40 are in contact with each other, thereby causing the hook part 33 to engage with the groove 43. Next, after having covered the top surface 34 of the first spacer 30 and the top surface 44 of the second spacer 40 with the top plate 51 of the fastening part 50, the set screw 56 is tightened into the screw hole 35 from the screw hole 54. The assembly of the spacer-attached antenna unit 10 is completed upon completion of the steps described above.

Next, a task is performed in which the spacer-attached antenna unit 10 is attached to the glass plate 18. That is, after peeling off the release liners 64 and 64 from the adhesive tape 62 and 62 affixed to the second spacers 40 and 40, the second spacers 40 and 40 are affixed to the glass plate 18 by the adhesive tape 62 and 62 (see FIG. 1). Then, the lower ends of linear members 66 and 66 such as wires are linked to the fastening parts 50 and 50 and the upper ends of the linear members 66 and 66 are linked to the top horizontal frame 26A of the window frame 26. The antenna unit-attached glass window 12 according to the first embodiment is assembled upon doing so. The linear members 66 and 66 are not essential members.

Next, a removal method for removing the antenna unit 16 from the glass window 17 for performing maintenance on the antenna unit 16 is described.

First, the lower ends of the linear members 66 and 66 are removed from the fastening parts 50 and 50. Next, the set screws 56 and 56 are loosened, and then the fastening parts 50 and 50 are removed from the first spacers 30 and the second spacers 40. Next the antenna unit 16 is lifted upwards in the Z-axis direction. By doing so, the first spacer 30 is moved upwards with respect to the second spacer 40, thereby removing the hook part 33 of the first spacer 30 from the groove 43 of the second spacer 40. Thereafter, the antenna unit 16 is pulled toward the interior. The antenna unit 16 can be removed from the glass window 17 by performing this action.

Therefore, since the antenna unit 16 according to the spacer-attached antenna unit 10 according to the first embodiment can be detachably attached to the glass plate 18 of the glass window 17 via the spacer 20 that is the detachable member, the antenna unit 16 can be easily removed from the glass window 17.

Here, the first spacer 30 and the second spacer 40 of the spacer 20 according to the first embodiment are detachably linked by engaging the first spacer 30 and the second spacer 40 by the engaging portions and then linking the fastening part 50 to the first spacer 30. In other words, although an aspect in which the engaging portions are used as a detachable configuration is described, the engaging portions are not necessarily required. For example, four walls connected together to form a frame shape may be provided under the top plate 51 of the fastening part 50, thereby providing a cubic-shaped recess demarcated by the four side surfaces, into which the top portion of the first spacer 30 and the top portion of the second spacer 40 may be fitted. Then, the fastening part 50 is linked to the first spacer 30 or the second spacer 40 by the set screw 56. By using the fastening part 50 with such a configuration, the first spacer 30 and the second spacer 40 can be detachably linked by the fastening part 50 without using the aforementioned engaging portion.

Figure 13:
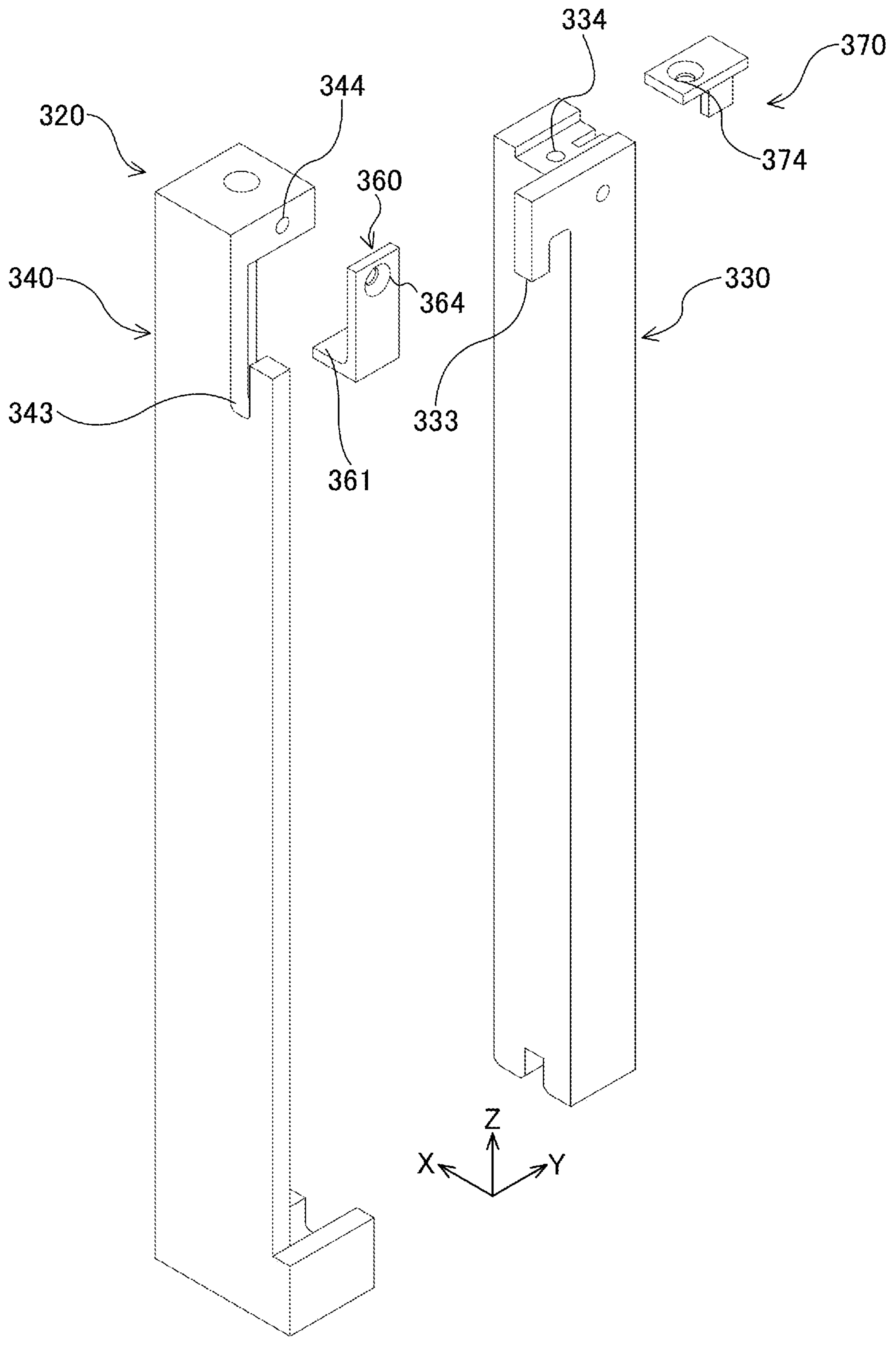
FIG. 13 is an assembly perspective view of a spacer on the left side in a modified example of the spacer-attached antenna unit according to the first embodiment.
Figure 14:
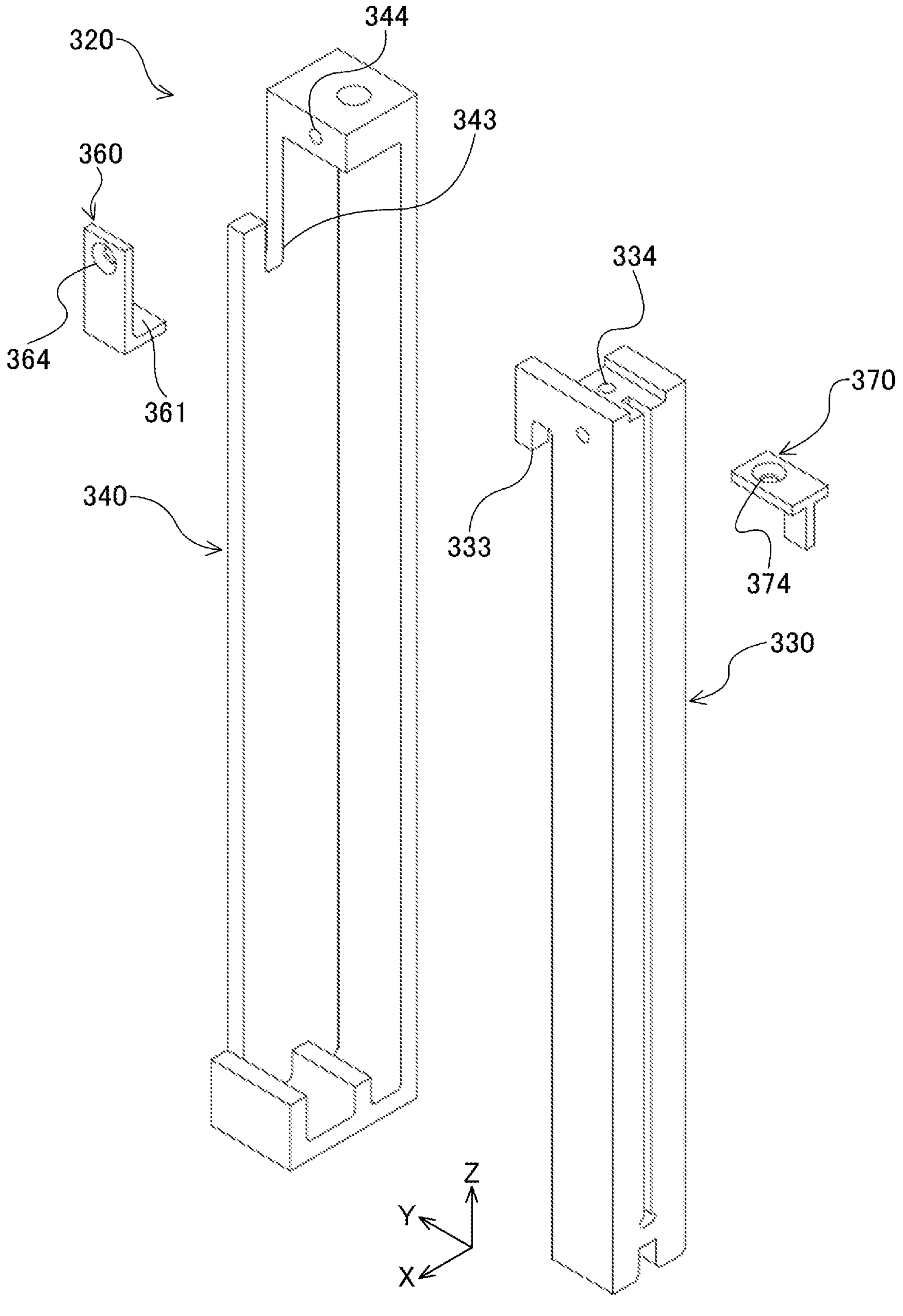
FIG. 14 is an assembly perspective view of a spacer on the right side in the modified example of the spacer-attached antenna unit according to the first embodiment.

FIG. 13 is an assembly perspective view of a spacer 320 on the left side in a modified example of the spacer-attached antenna unit 10 according to the first embodiment, whereas FIG. 14 is an assembly perspective view of a spacer 320 on the right side in the modified example of the spacer-attached antenna unit 10 according to the first embodiment. In the description below for the configuration of the spacer 320, since the spacers 320 and 320 on the left and right have the same configuration, the spacer 320 illustrated in FIG. 13 is described, and the spacer 320 illustrated in FIG. 14 is denoted with the same reference numerals as the spacer 320 in FIG. 13 in lieu of providing a description.

As illustrated in FIG. 13, the spacer 320 includes a first spacer 330 to be attached to the antenna unit 16 (see FIG. 3) side, a second spacer 340 to be attached to the glass plate 18 (see FIG. 1) side, and further includes a rotation part 360 and a top plate 370 in place of not using the fastening part 50. Similarly to the aforementioned spacer-attached antenna unit 10 according to the first embodiment, the second spacer 340 and the first spacer 330 become engaged by the engaging of a groove 343 and a hook part 333, and this restricts tilting of the first spacer 330 with respect to the second spacer 340. While the groove 343 and the hook part 333 are engaged, the second spacer 340 protrudes in the longitudinal axis (Z axis) direction with respect to the first spacer 330, and the rotation part 360 is linked to the second spacer 340 by tightening a screw (not illustrated) into a screw hole 344 from a screw hole 364. The rotation part 360 is in an L-shape and is a member supported by the second spacer 340 such that the rotation part 360 is rotatable in a YZ plane with the screw holes 364 and 344 as the axis. The top plate 370 is linked to the first spacer 330 by tightening a screw (not illustrated) into a screw hole 334 from a screw hole 374.

Figure 15:
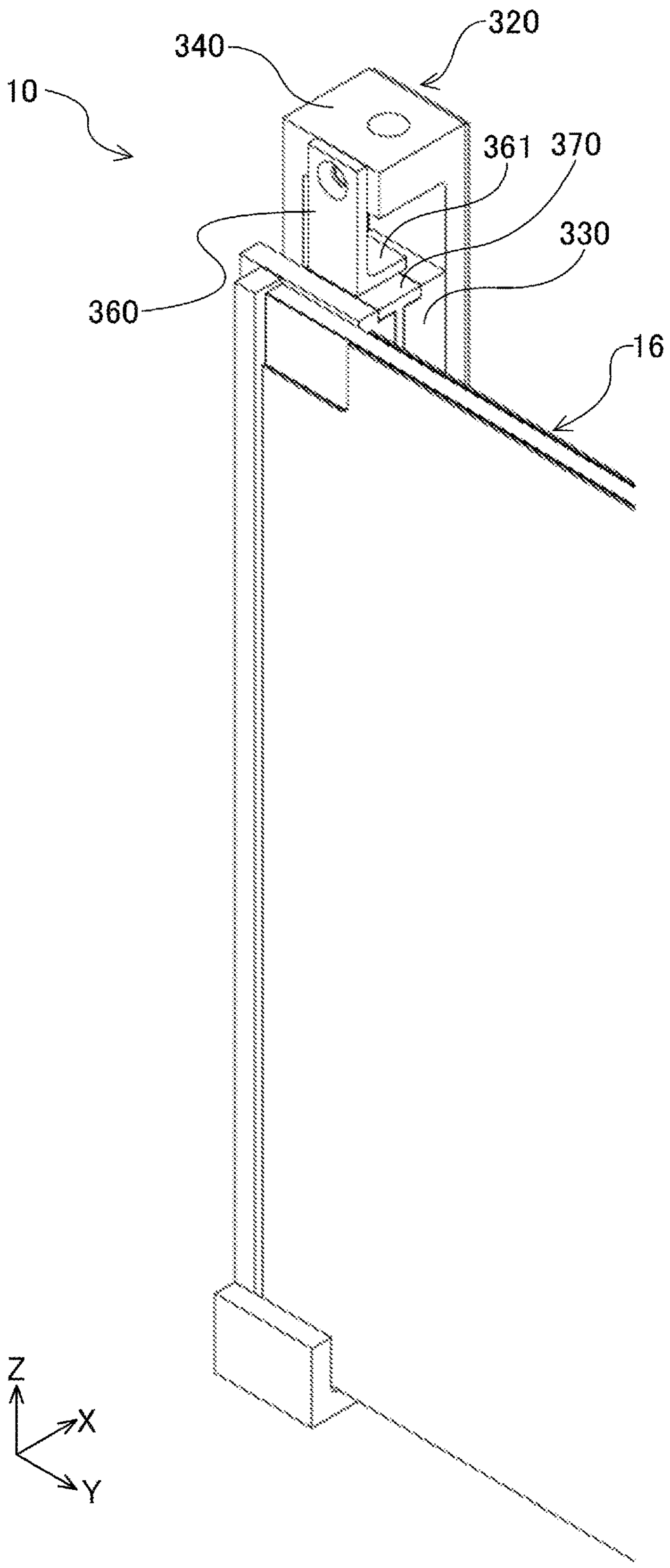
FIG. 15 is an enlarged perspective view of the spacer-attached antenna unit when the first spacer of the spacer on the left side in the modified example is attached to the antenna unit and is engaged with the second spacer.

FIG. 15 is an enlarged perspective view of the spacer-attached antenna unit 10 when the first spacer 330 of the spacer 320 on the left side of the modified example is attached to the antenna unit 16 and is engaged with the second spacer 340. There is a risk of the first spacer 330 vibrating due to an earthquake or the like and consequently moving upwards with respect to the second spacer 340. Even if a force acts on the first spacer 330 to move upwards with respect to the second spacer 340, since a protruding portion 361 of the rotation part 360 is positioned directly over the first spacer 330, the first spacer 330 hits the protruding portion 361. Therefore, the hook part 333 of the first spacer 330 does not come out the groove 343 of the second spacer 340, thereby preventing the antenna unit 16 from falling down.

Figure 16:
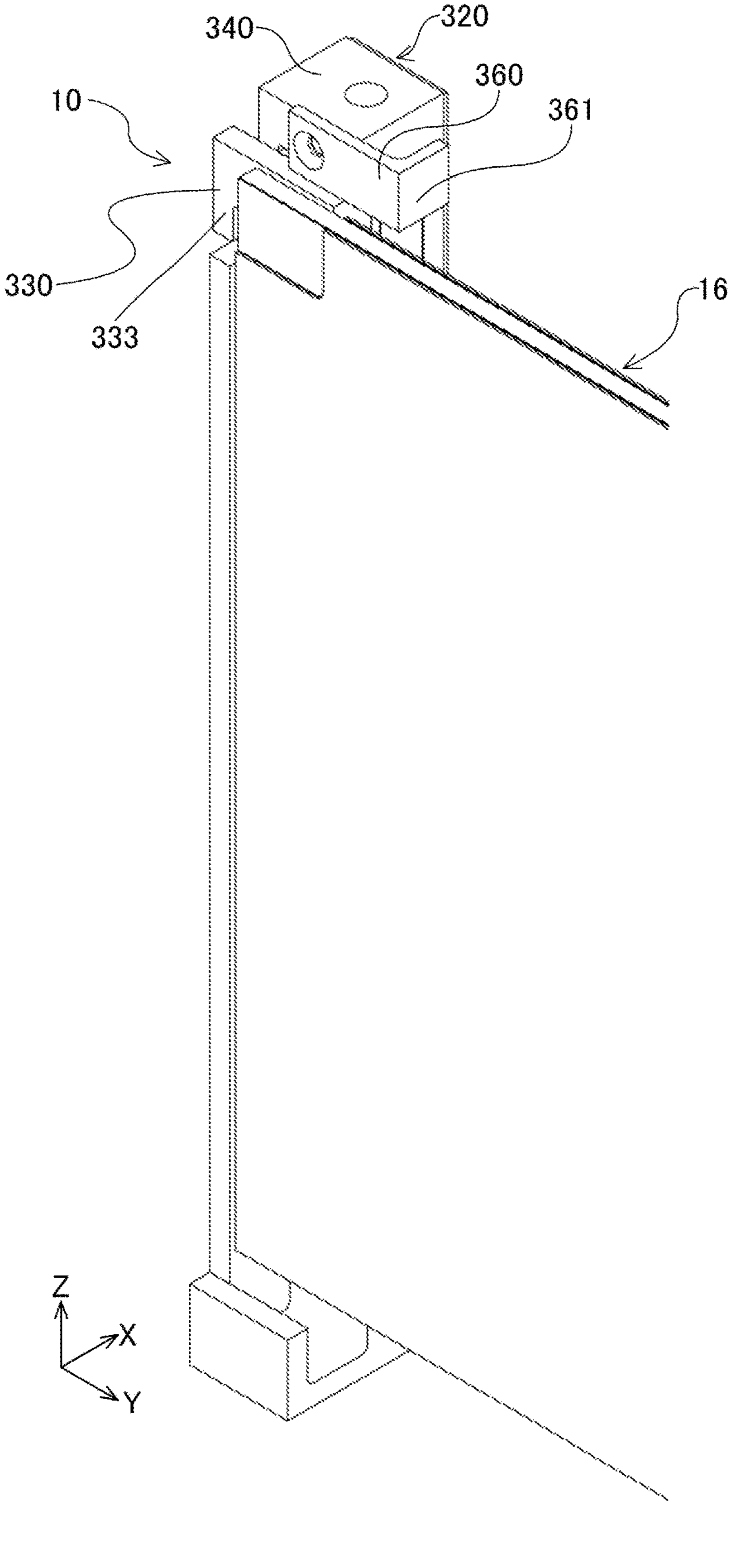
FIG. 16 is an enlarged perspective view of spacer-attached antenna unit when the first spacer of the modified example attached to the antenna unit is removed from the second spacer.

FIG. 16 is an enlarged view of the spacer-attached antenna unit 10 when the first spacer 330 in the modified example attached to the antenna unit 16 is removed from the second spacer 340. The rotation part 360 is rotated substantially 90 degrees in a YZ-plane with respect to the position in FIG. 15 with the screw holes 364 and 344 as the axis. By doing so, the first spacer 330 does not hit the protruding portion 361 even when the first spacer 330 is moved upwards with respect to the second spacer 340. Therefore, the hook part 333 of the first spacer 330 comes out of the groove 343 of the second spacer 340, and thus the antenna unit 16 can be removed from the second spacer 340.

Next, a spacer-attached antenna unit of a second embodiment is described.

Figure 6:
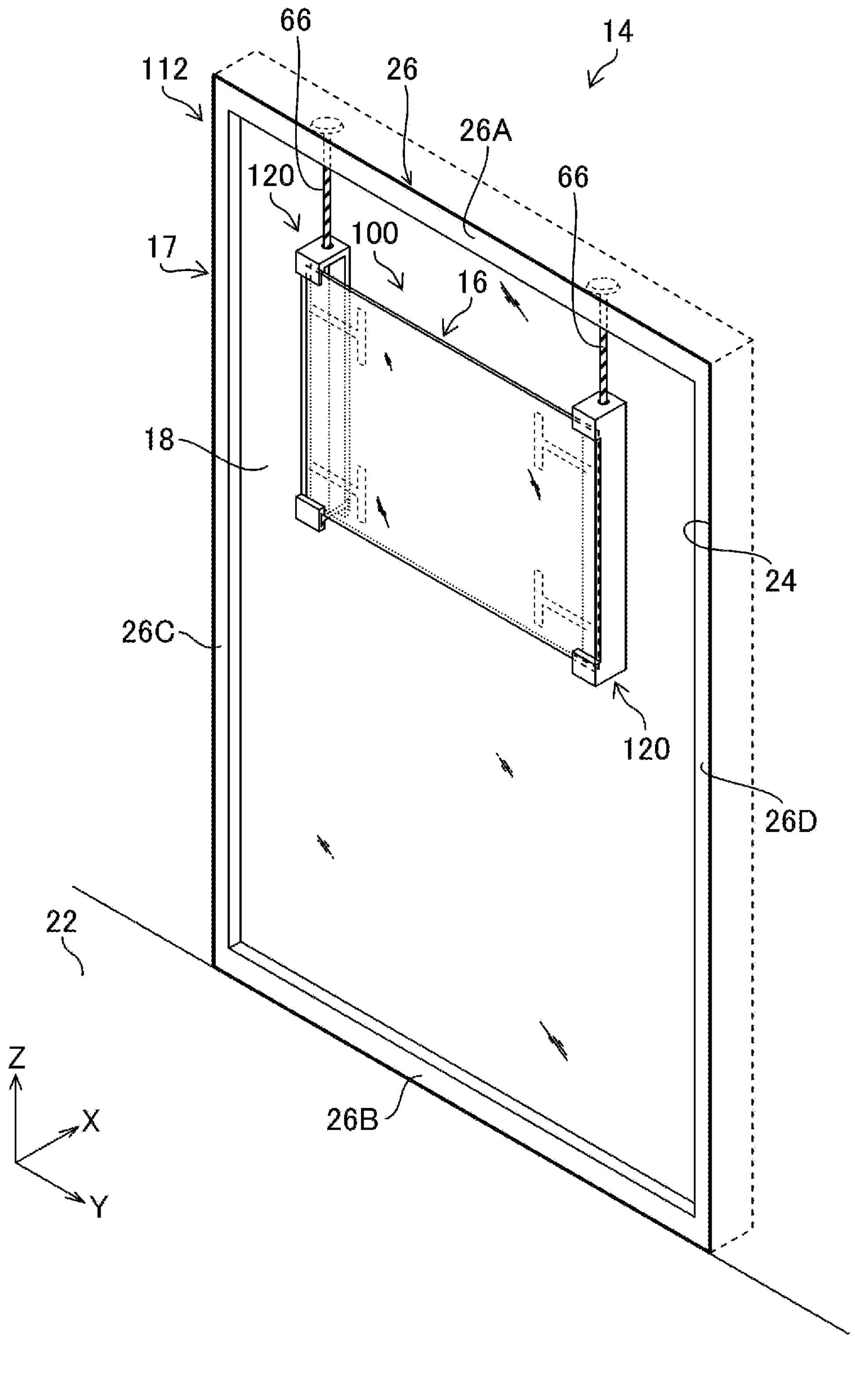
FIG. 6 is a perspective view of an antenna unit-attached glass window according to a second embodiment as viewed from inside the building.
Figure 7:
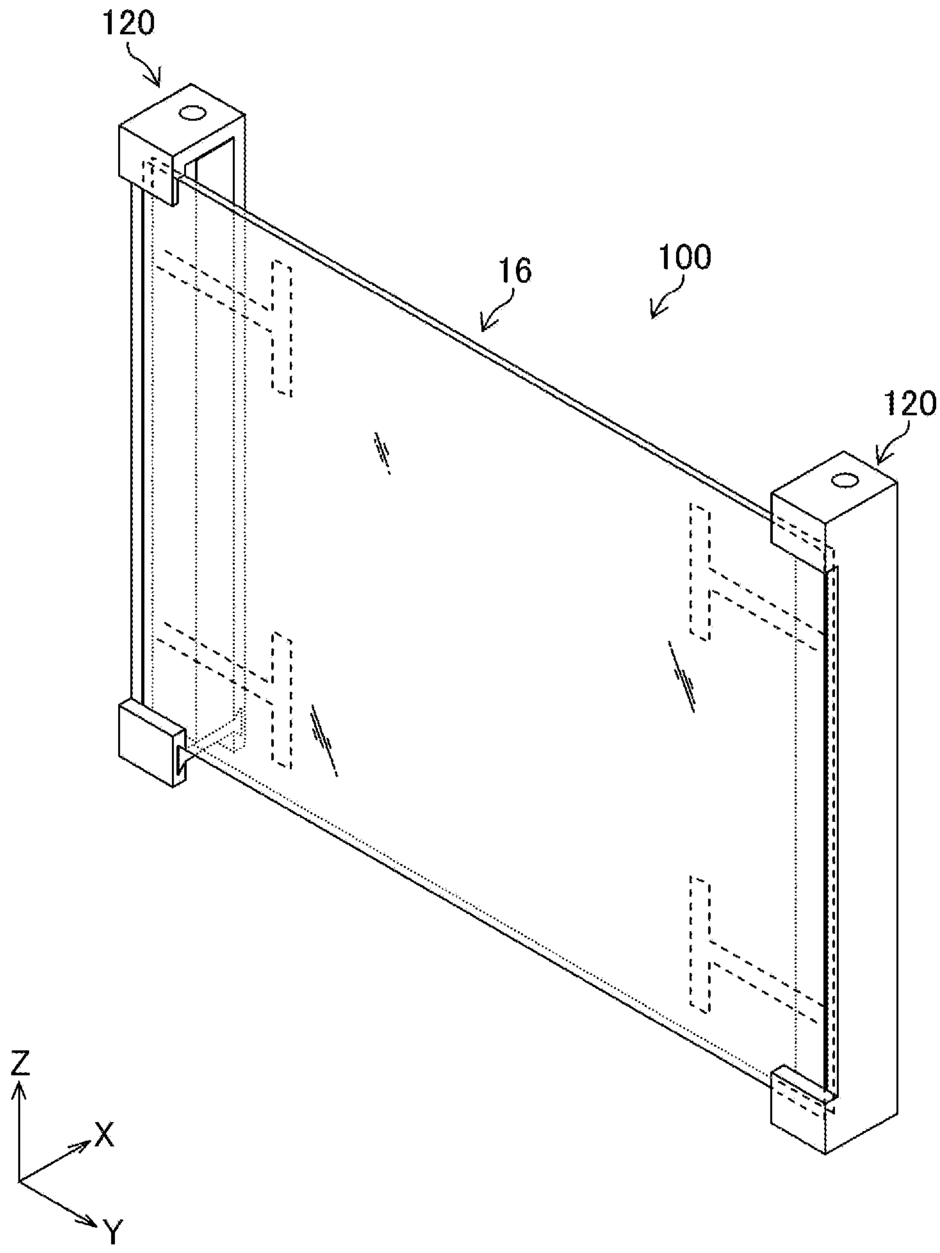
FIG. 7 is an enlarged perspective view of a spacer-attached antenna unit according to the second embodiment.

FIG. 6 is a perspective view of an antenna unit-attached glass window 112 of the second embodiment in which a spacer-attached antenna unit 100 according to the second embodiment is attached to the glass window 17. FIG. 7 is an enlarged perspective view of the spacer-attached antenna unit 100 illustrated in FIG. 6. FIG. 6 and FIG. 7 depict the spacer-attached antenna unit 100 as viewed from the interior of the building 14.

In the description below of the spacer-attached antenna unit 100 and the antenna unit-attached glass window 112, the members that are the same or similar to the spacer-attached antenna unit 10 and the antenna unit-attached glass window 12 illustrated in FIG. 1 to FIG. 5 are denoted with the same reference numerals in lieu of providing a description for these.

The antenna unit 16 of the spacer-attached antenna unit 10 illustrated in FIG. 6 is detachably attached to the glass plate 18 via a pair of spacers 120 and 120. These spacers 120 and 120 are an example of a detachable member.

Figure 8:
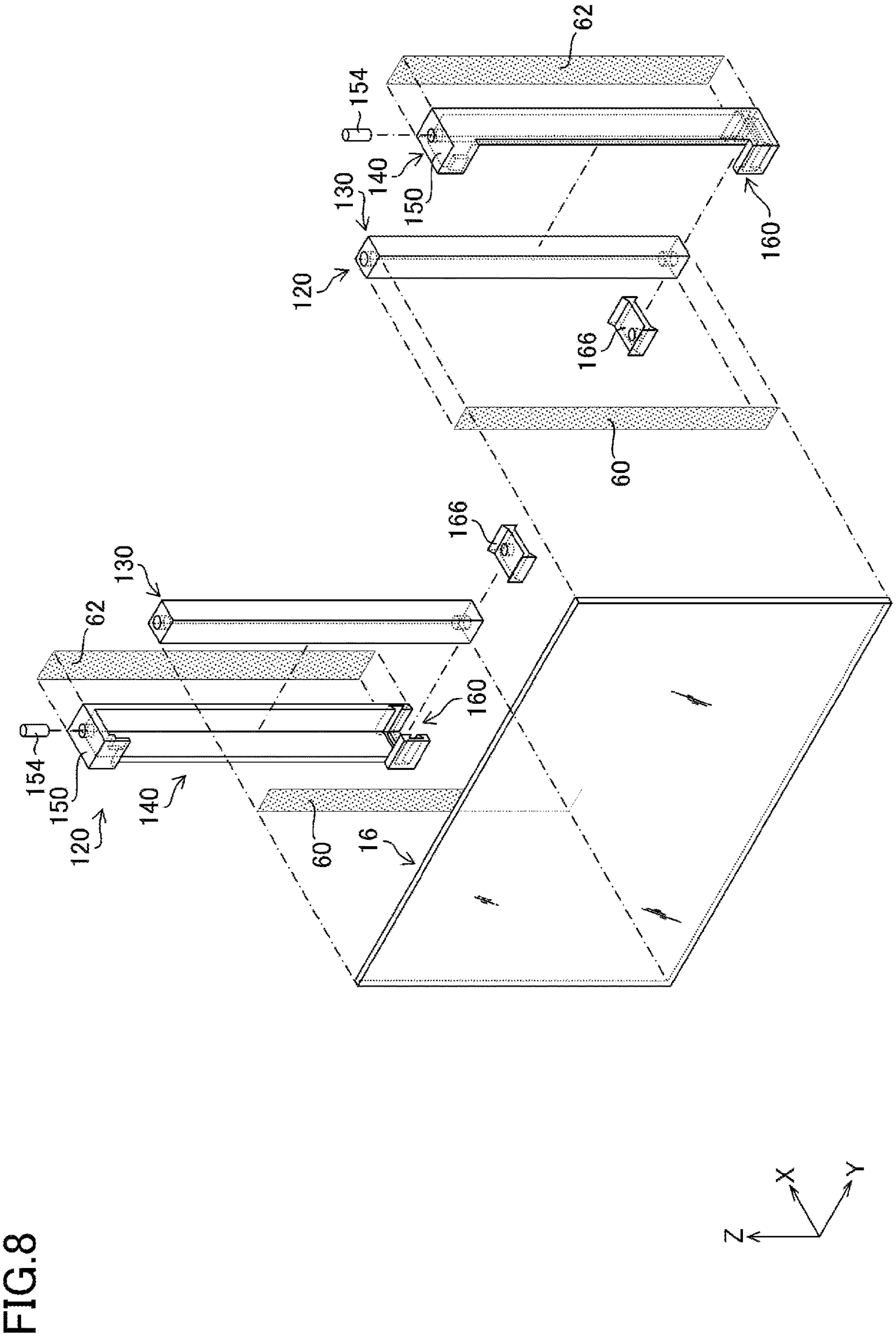
FIG. 8 is an assembly perspective view of the spacer-attached antenna unit illustrated in FIG. 7.
Figure 9:
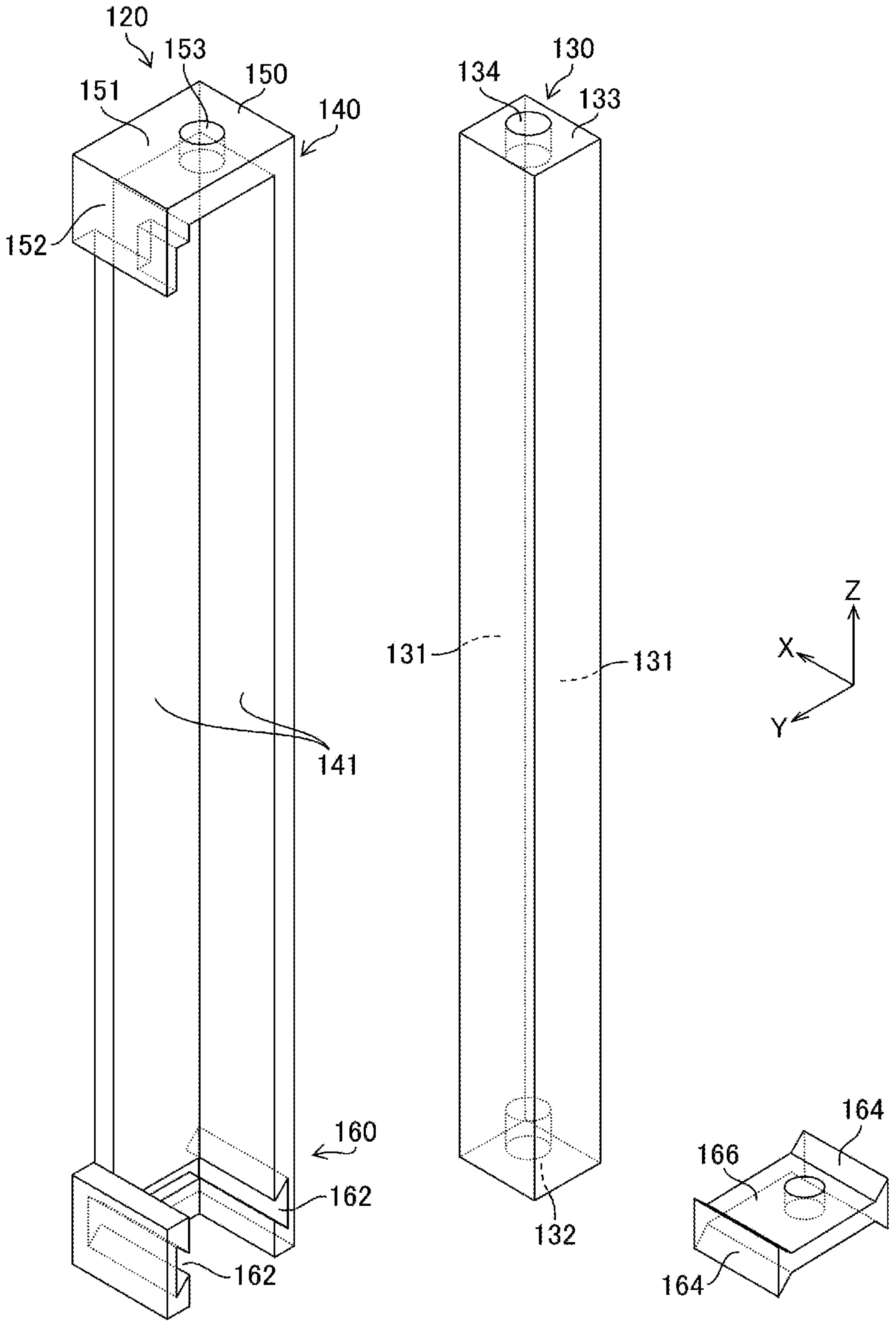
FIG. 9 is an assembly perspective view of a spacer disposed on the left side in FIG. 7.
Figure 10:
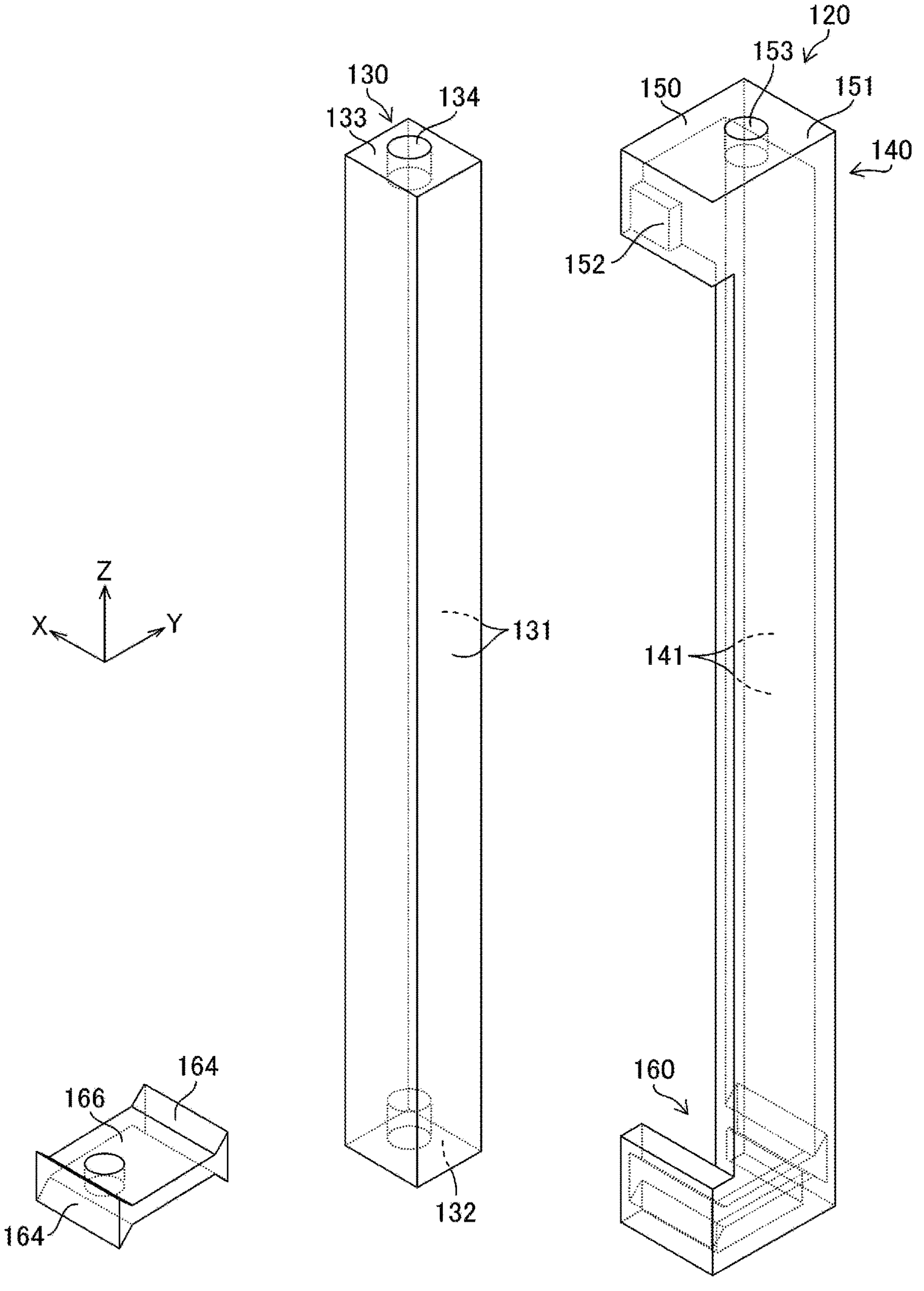
FIG. 10 is an assembly perspective view of a spacer disposed on the right side in FIG. 7.

FIG. 8 is an assembly perspective view of the spacer-attached antenna unit 100. Also, FIG. 9 is an assembly perspective view of a spacer 120 on the left side illustrated in FIG. 6, whereas FIG. 10 is an assembly perspective view of a spacer 120 on the right side illustrated in FIG. 6. In the description below of the configuration of the spacer 120, since the spacers 120 and 120 on the left and right sides illustrated in FIG. 8 to FIG. 10 have the same configuration, here, the spacer 120 illustrated in FIG. 9 is described and the spacer 120 illustrated in FIG. 10 is denoted with the same reference numbers as the spacer in FIG. 9 in lieu of providing a description.

As illustrated in FIG. 9, the spacer 120 includes a first spacer 130 to be attached to the antenna unit 16 (see FIG. 8) side, a second spacer 140 to be attached to the glass plate 18 (see FIG. 6), and a fastening part 150 that detachably links the first spacer 130 and the second spacer 140. The spacer 120 also includes a designating portion 160 that designates a linking position between the first spacer 130 and the second spacer 140.

The first spacer 130 and the second spacer 140 are constituted by rectangular columnar members, each member having a longitudinal axis (Z axis). Specifically, the first spacer 130 is configured such that the cross-sectional shape in the X-Y plane is substantially rectangularly columnar whereas the second spacer 140 is configured such that the cross-sectional shape in the X-Y plane is L-shaped and columnar.

The first spacer 130 and the second spacer 140 respectively have a pair of guide surfaces 131 and 131 and pair of guide surfaces 141 and 141 for slidably guiding the first spacer 130 and the second spacer 140 in the direction of the respective longitudinal axes. The mutual linking position within a sliding range in which the first spacer 130 and the second spacer 140 are slidable is designated by the designating portion 160. Also, as one example, the guide surfaces 131 and 131 and 141 and 141 are configured as flat side surfaces facing each other in the X-axis direction and the Y-axis direction. Also, the designating portion 160 includes, as one example, a pair of dovetail grooves 162 and 162 formed on the bottom portion of the second spacer 140; and a receiving plate 166 having a pair of dovetail portions 164 and 164 that are detachably fitted into the dovetail grooves 162 and 162. The linking position between the first spacer 130 and the second spacer 140 is designated by placing the receiving plate 166 at the bottom portion of the second spacer 140 and then bringing a bottom surface 132 of the first spacer 130 into contact with this receiving plate 166 or placing the bottom surface 132 of the first spacer 130 on the receiving plate 166. The first spacer 130 and the receiving plate 166 may be detachably fixed by a set screw (not illustrated).

The fastening part 150 is integrated with the upper portion of the second spacer 140 and has a top plate 151 and a wall portion 152. A through hole 153 is formed in the top plate 151 in the Z-axis direction, and a hole 134 is formed in a top surface 133 of the first spacer 130, in the Z-axis direction, facing this through hole 153. Also, a pin 154 illustrated in FIG. 8 is fitted into the through hole 153 and the bottom portion of the pin 154 passing through the through hole 153 is inserted into the hole 134 of the first spacer 130. By doing so, the first spacer 130 and the second spacer 140 are detachably linked by the pin 154 of the fastening part 150. Also, by inserting the bottom portion of the pin 154 into the hole 134, the first spacer 30 is restricted from tilting with respect to the second spacer 40.

In order to enable the aforementioned sliding actions in the spacer 120 of the embodiment, the bottom portion of the second spacer 140 of the spacer 120 of the embodiment is open so that the first spacer 130 can be inserted and removed from the bottom portion thereof. Also, the top portion of the first spacer 130 is also restricted from the aforementioned tilting by being brought into contact with the wall portion 152 of the fastening part 150.

Next, an example of an assembly method of the antenna unit-attached glass window 112 according to the second embodiment is described.

First, in order to assemble the spacer-attached antenna unit 100, the first spacers 130 and 130 are affixed to the vertical edge portions on both of the left and right sides of the main surface 16B of the antenna unit 16 by the adhesive tape 60 and 60. Next, the first spacers 130 and 130 that are affixed to the antenna unit 16 and the second spacers 140 and 140 are linked. That is, after the top portion of the first spacer 130 is inserted from the bottom open portion of the second spacer 140, the first spacer 130 and the second spacer 140 are slid with respect to each other in a state where the guide surfaces 131 and 131 of the first spacer 130 and the guide surfaces 141 and 141 of the second spacer 140 are in contact with each other, and then the bottom portion of the pin 154 is inserted into the hole 134 of the first spacer 130. Next, the receiving plate 166 is arranged on the bottom portion of the second spacer 140, and the bottom surface 132 of the first spacer 130 is placed on this receiving plate 166. The assembly of the spacer-attached antenna unit 100 is completed upon completion of the steps described above.

Next, a task is performed in which the spacer-attached antenna unit 100 is attached to the glass plate 18. That is, after peeling off the release liners 64 and 64 (See FIG. 3) from the adhesive tape 62 and 62 (see FIG. 8) affixed to the second spacers 140 and 140, the second spacers 140 and 140 are affixed to the glass plate 18 by the adhesive tape 62 and 62 (see FIG. 6). Then, the lower ends of the linear members 66 and 66 are linked to the fastening parts 150 and 150 and the upper ends of the linear members 66 and 66 are linked to the top horizontal frame 26A of the window frame 26 (see FIG. 6). Upon doing so, the antenna unit-attached glass window 12 according to the second embodiment is assembled.

Next, a removal method for removing the antenna unit 16 from the glass window 17 is described.

First, the receiving plate 166 is removed from the bottom portion of the second spacer 140 so that the bottom portion of the second spacer 140 is open. Next, the antenna unit 16 is moved downwards in the Z-axis direction. By doing so, the first spacer 30 is moved downwards with respect to the second spacer 40 and thus the hole 134 is separated from the pin 154. Then, the antenna unit 16 is moved downwards further, thereby causing the first spacer 130 to be pulled out from the bottom open portion of the second spacer 140. By performing these actions, the antenna unit 16 can be removed from the glass window 17.

Therefore, according to the spacer-attached antenna unit 100 of the second embodiment, since the antenna unit 16 can be detachably attached to the glass plate 18 of the glass window 17 via the spacer 120 that is the detachable member, the antenna unit 16 can be easily removed from the glass window 17.

Next, a spacer-attached antenna unit of a third embodiment is described.

Figure 11:
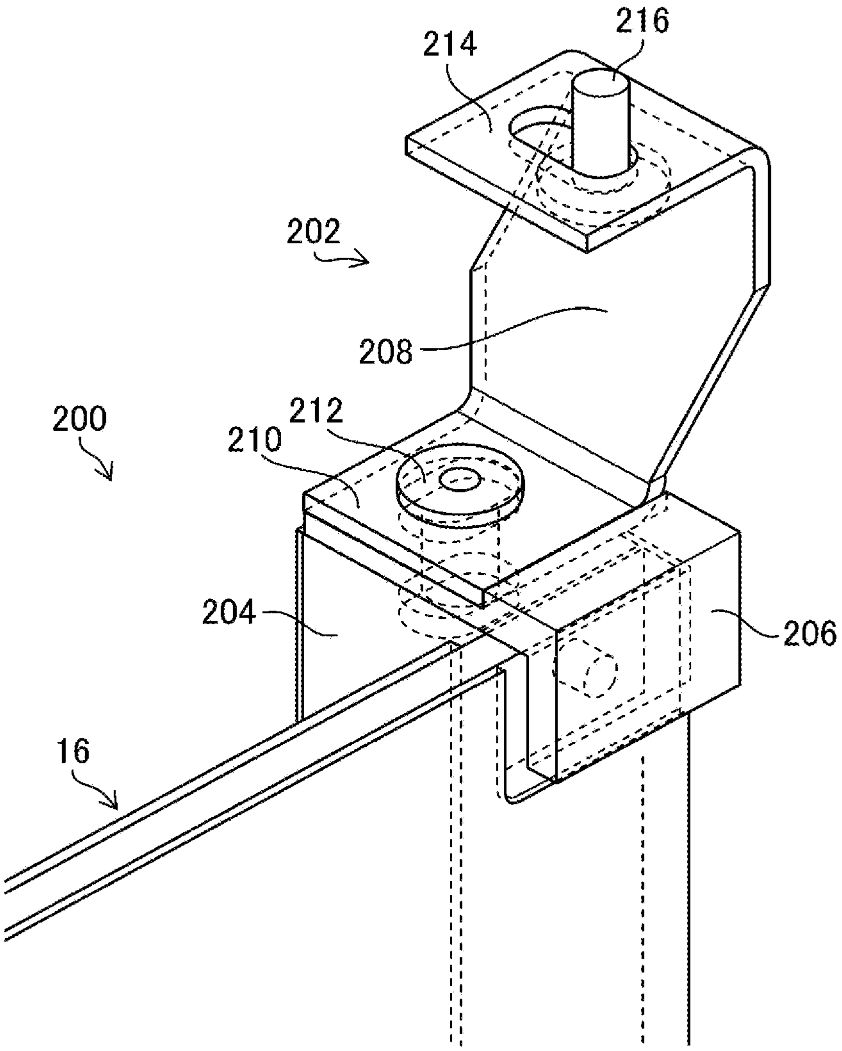
FIG. 11 is a perspective view of the main portions of a spacer-attached antenna unit according to a third embodiment.
Figure 12:
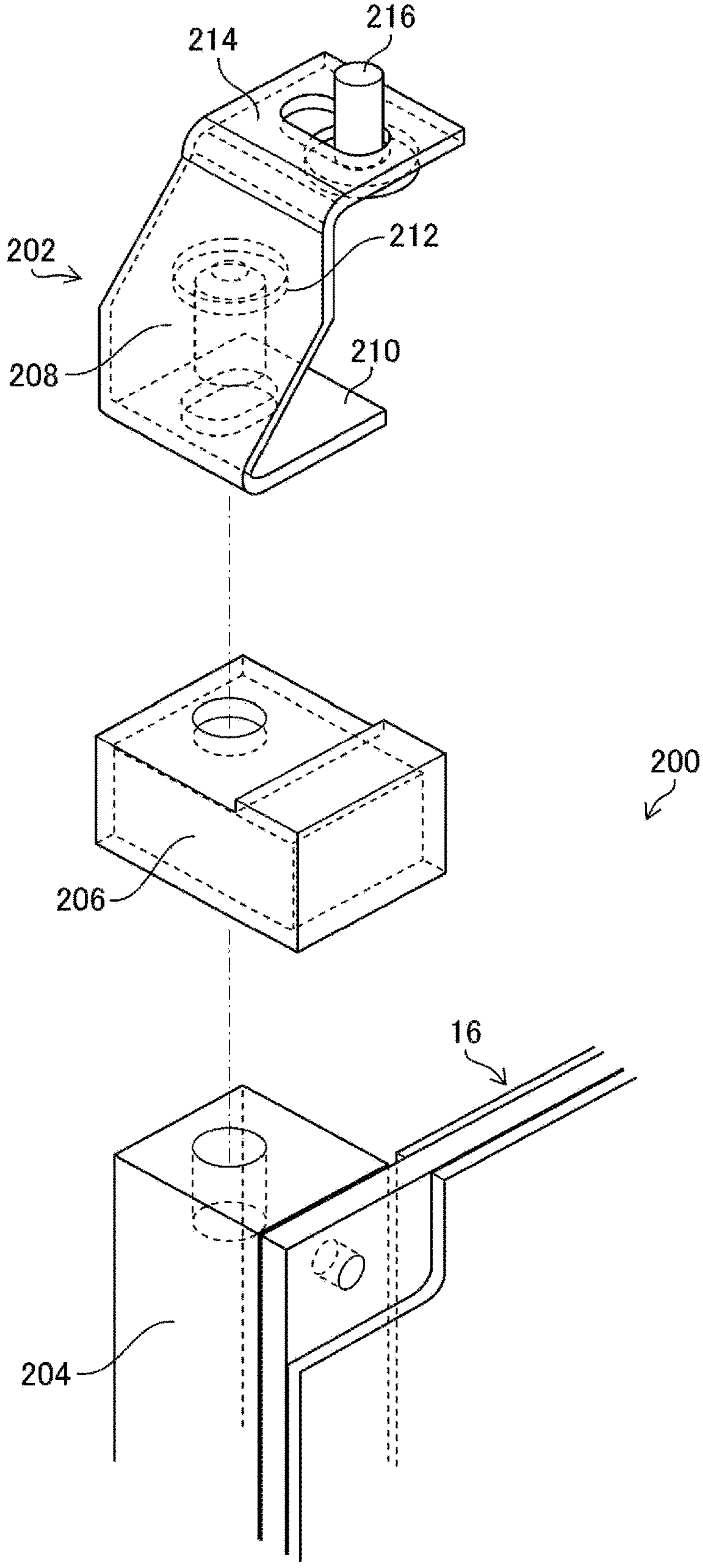
FIG. 12 is an assembly perspective view of the spacer-attached antenna unit according to the third embodiment.

FIG. 11 is a perspective view of the main portions of a spacer-attached antenna unit 200 of the third embodiment and FIG. 12 is an assembly perspective view of the spacer-attached antenna unit 200.

The antenna unit 16 of the spacer-attached antenna unit 200 illustrated in FIG. 11 and FIG. 12 is detachably attachable, via a suspension member 202, to the top horizontal frame 26A of the window frame 26 (see FIG. 1) included in the glass window 17 (see FIG. 1). The suspension member 202 is an example of the detachable member. In other words, the third embodiment illustrates an aspect in which the detachable member includes the suspension member 202 and in which the spacer-attached antenna unit 200 is detachably attached to the window frame 26 (see FIG. 1) by the suspension member 202.

The suspension member 202 includes a fastening part 206 that is detachably attached to a spacer 204 and includes a bracket 208 that is detachably attached to the top horizontal frame 26A (see FIG. 1). The fastening part 206 is made to cover the top portion of the spacer 204 and the top corner portion of the antenna unit 16, and is detachably linked to the top portion of the spacer 204 by a set screw 212 together with a bottom horizontal portion 210 of the bracket 208. Also, a top horizontal portion 214 of the bracket 208 is detachably linked to the top horizontal frame 26A (see FIG. 1) by a set screw 216. Here, the fastening part 206 is an example of a first detachable part and the bracket 208 is an example of a second detachable part.

According to the spacer-attached antenna unit 200 configured as described above, the antenna unit 16 can be removed from the glass window 17 (see FIG. 1) by removing the bracket 208 from the top horizontal frame 26A (see FIG. 1) by loosening the set screw 216 and by removing the antenna unit 16 from the bracket 208 by loosening the set screw 212.

Therefore, according to the spacer-attached antenna unit 200 according to the third embodiment, since the antenna unit 16 is detachably attached to the window frame 26 of the glass window 17 via the suspension member 202 that is the detachable member, the antenna unit 16 can be easily removed from the glass window 17.

Also, the spacer 204 illustrated in FIG. 11 and FIG. 12 is preferably one transparent member. The spacer 204 is preferably affixed to the antenna unit 16 by the adhesive tape 60 (see FIG. 3).

Although embodiments of the present invention are described, the present invention is not limited to the aforementioned embodiments, and various improvements and modifications can be made to the aforementioned embodiments without departing from the scope of the present invention.

According to the present disclosure, the antenna unit can be easily removed from the glass window.

What is claimed is:

1. A spacer-attached antenna unit, comprising:

an antenna unit; and a detachable member comprising a spacer device attached to the antenna unit and configured to detachably attach the antenna unit to a glass plate of a glass window, wherein the spacer device of the detachable member includes a first spacer configured to attach to the antenna unit and a second spacer configured to attach to the glass plate of the glass window and detachably attach to the first spacer.

2. The spacer-attached antenna unit according to claim 1, wherein the first spacer of the detachable member is columnar member having a longitudinal axis and configured to attach to the antenna unit, and the second spacer of the detachable member is a columnar member having a longitudinal axis and configured to attach to the glass plate.

3. The spacer-attached antenna unit according to claim 2, wherein the first spacer and the second spacer having respective guide surfaces configured to slidably guide the first spacer and the second spacer in a direction of the respective longitudinal axes and having respective designating portions that designate a mutual linking position within a sliding range in which the first spacer and the second spacer are slidable, and the detachable member includes a fastening part that detachably fixes the first spacer and the second spacer such that the first spacer and the second spacer are detachably linked by the fastening part at the linking position designated by the respective designating portions.

4. The spacer-attached antenna unit according to claim 3, wherein the glass plate of the glass window is placed in a vertical direction, the longitudinal axes of the first spacer and the second spacer are configured to be positioned in a vertical direction in which the glass plate of the glass window is placed, and the first spacer is configured to be removed from the second spacer by moving the first spacer upwards with respect to the second spacer.

5. The spacer-attached antenna unit according to claim 4, wherein a top portion of the first spacer has an engaging portion and a top portion of the second spacer has an engaging portion such that the engaging portions of the first and second spacer are configured to restrict the first spacer from tilting with respect to the second spacer by the engaging portions engaging with each other.

6. The spacer-attached antenna unit according to claim 5, wherein the engaging portions have a groove formed on one of the first spacer and the second spacer, and a hook part formed on the other one of the first spacer and the second spacer such that the first spacer is restricted from tilting with respect to the second spacer.

7. The spacer-attached antenna unit according to claim 3, wherein the glass plate of the glass window is placed in a vertical direction, the longitudinal axes of the first spacer and the second spacer are configured to be positioned in a vertical direction in which the glass plate of the glass window is placed, and the first spacer is configured to be removed from the second spacer by moving the first spacer downwards with respect to the second spacer.

8. The spacer-attached antenna unit according to claim 3, wherein the detachable member is formed in a plurality such that the plurality of detachable members is configured to detachably attach the antenna unit to the glass plate of the glass window.

9. The spacer-attached antenna unit according to claim 2, wherein the detachable member includes a rotation part rotatably supported by the second spacer.

10. The spacer-attached antenna unit according to claim 1, wherein the detachable member includes a fastening part that detachably fixes the first spacer and the second spacer.

11. The spacer-attached antenna unit according to claim 10, wherein the first spacer and the second spacer are configured to engage such that the second spacer is detachably attached to the first spacer, and the fastening part of the detachable member has a lid shape configured to link the first spacer and the second spacer such that the fastening part covers top surfaces of the first and second spacers.

12. The spacer-attached antenna unit according to claim 1, wherein the detachable member includes a rotation part rotatably supported by the second spacer.

13. The spacer-attached antenna unit according to claim 1, wherein the antenna unit and the first spacer are fixed together by a first adhesive tape, and a second adhesive tape is affixed to a glass-plate-facing side surface of the second spacer.

14. The spacer-attached antenna unit according to claim 13, wherein the first spacer, the second spacer, the first adhesive tape, and the second adhesive tape are transparent members, respectively.

15. An antenna unit-attached glass window, comprising:

a glass plate;

a window frame attached to an edge portion of the glass plate; and the spacer-attached antenna unit of claim 1 attached to the glass plate.

16. The spacer-attached antenna unit according to claim 1, wherein the detachable member includes a suspension member comprising a first detachable part configured to be detachably attached to the spacer and a second detachable part configured to be detachably attached to a window frame in the glass window.

17. The spacer-attached antenna unit according to claim 16, wherein the first detachable part of the suspension includes a fastening part comprising a set screw and configured to be detachably linked to a top portion of the spacer device, and the second detachable part of the suspension includes a bracket configured to be detachably attached to window frame in the glass window.

18. The spacer-attached antenna unit according to claim 1, wherein the detachable member is formed in a plurality such that the plurality of detachable members is configured to detachably attach the antenna unit to the glass plate of the glass window.

19. A spacer-attached antenna unit, comprising:

an antenna unit; and a detachable member comprising a spacer device attached to the antenna unit and configured to detachably attach the antenna unit to a glass plate of a glass window, wherein the detachable member includes a suspension member comprising a first detachable part configured to be detachably attached to the spacer device and a second detachable part configured to be detachably attached to a window frame in the glass window.

20. The spacer-attached antenna unit according to claim 19, wherein the first detachable part of the suspension includes a fastening part comprising a set screw and configured to be detachably linked to a top portion of the spacer device, and the second detachable part of the suspension includes a bracket configured to be detachably attached to window frame in the glass window.

* * * * *